United States Patent
Sajassi et al.

(10) Patent No.: US 8,121,041 B2
(45) Date of Patent: Feb. 21, 2012

(54) REDUNDANCY FOR POINT-TO-MULTIPOINT AND MULTIPOINT-TO-MULTIPOINT ETHERNET VIRTUAL CONNECTIONS

(75) Inventors: Ali Sajassi, San Ramon, CA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 11/881,917

(22) Filed: Jul. 30, 2007

(65) Prior Publication Data

US 2009/0034413 A1 Feb. 5, 2009

(51) Int. Cl.
  *H04L 12/26* (2006.01)
(52) U.S. Cl. .................................................. 370/248
(58) Field of Classification Search .................. 370/389, 370/401, 390, 227–228; 709/238
  See application file for complete search history.

(56) References Cited

U.S. PATENT DOCUMENTS

| 6,181,680 | B1 * | 1/2001 | Nagata et al. ............. 370/248 |
| 7,590,054 | B1 * | 9/2009 | Holness et al. ............ 370/225 |
| 7,660,241 | B2 * | 2/2010 | Sridhar et al. ............. 370/229 |
| 2003/0016624 | A1 * | 1/2003 | Bare ............................ 370/217 |
| 2004/0223463 | A1 | 11/2004 | MacKiewich et al. |
| 2005/0021844 | A1 * | 1/2005 | Puon et al. ................... 709/238 |
| 2007/0014290 | A1 * | 1/2007 | Dec et al. ..................... 370/390 |
| 2007/0076719 | A1 * | 4/2007 | Allan et al. ................... 370/392 |
| 2007/0086333 | A1 * | 4/2007 | Doukai et al. ................ 370/228 |
| 2007/0091796 | A1 * | 4/2007 | Filsfils et al. ................. 370/228 |
| 2007/0147231 | A1 | 6/2007 | Yoshida et al. |
| 2007/0263640 | A1 * | 11/2007 | Finn ............................. 370/401 |
| 2007/0268817 | A1 * | 11/2007 | Smallegange et al. ........ 370/216 |
| 2008/0095047 | A1 * | 4/2008 | Skalecki et al. ............. 370/225 |
| 2008/0219268 | A1 * | 9/2008 | Dennison ................... 370/395.2 |

FOREIGN PATENT DOCUMENTS

| CN | 1428977 A | 7/2003 |
| EP | 1 333 624 A | 8/2003 |
| WO | WO 2007/068078 A | 6/2007 |

OTHER PUBLICATIONS

"Virtual Bridged Local Area Networks—Amendment 5: Connectivity Fault Management", IEEE P802.1ag/D1.0, pp. 5-9 and 39-84, Dec. 3, 2004.
Sridhar K et al:"End-To-End Ethernet Connectivity Fault Management in Metro and Access Networks", Internet Citation, [Online] XP002346929.

* cited by examiner

*Primary Examiner* — Anh-Vu Ly
(74) *Attorney, Agent, or Firm* — Cindy Kaplan

(57) ABSTRACT

A method and system for redundancy in Ethernet Virtual Connections (EVCs) are disclosed. In one embodiment, a method includes transmitting continuity check messages from a node in an Ethernet Virtual Connection connecting at least one root node and a plurality of leaf nodes in a point-to-multipoint or multipoint-to-multipoint connection, identifying a failure in a primary path between the root node and the leaf nodes, switching to a backup path, and advertising the switching to the backup path to at least one node.

19 Claims, 4 Drawing Sheets

REDUNDANCY FOR POINT-TO-MULTIPOINT AND MULTIPOINT-TO-MULTIPOINT ETHERNET VIRTUAL CONNECTIONS

BACKGROUND OF THE INVENTION

The present disclosure relates generally to redundancy for point-to-multipoint and multipoint-to-multipoint Ethernet Virtual Connections (EVCs).

Many service providers are seeking to incorporate transport technologies which enable them to reduce capital expenses and operation expenses in their next generation networks. Ethernet transport can reduce expenses since it is already used in many networking products. Draft standard IEEE 802.1ah, entitled Provider Backbone Bridges, has been developed to address some of the internetworking issues with conventional Ethernet networking.

One important Ethernet attribute is the Ethernet Virtual Connection. An EVC is an association of two or more User-Network Interfaces (UNIs), where the UNI is a standard Ethernet interface that is the point of demarcation between customer equipment and a service provider's network. The EVC can connect two or more subscriber sites enabling the transfer of Ethernet service frames therebetween and preventing data transfer between subscriber sites that are not part of the same EVC.

Provider Backbone Transport (PBT) is an emerging transport technology that uses IEEE 802.1ah data-plane functionality and static provisioning of Ethernet paths by means of a network management system. The currently defined Provider Backbone Transport can only support point-to-point EVCs.

BRIEF DESCRIPTION OF THE DRAWINGS

Corresponding reference characters indicate corresponding parts throughout the several views of the drawings.

DESCRIPTION OF EXAMPLE EMBODIMENTS

Overview

A method and system for redundancy in Ethernet Virtual Connections (EVCS) are disclosed. In one embodiment, a method generally comprises transmitting continuity check messages from a node in an Ethernet Virtual Connection connecting at least one root node and a plurality of leaf nodes in a point-to-multipoint or multipoint-to-multipoint connection, identifying a failure in the primary path between the root node and the leaf nodes, switching to a backup path, and advertising the switching to the backup path to at least one of the nodes.

In another embodiment, an apparatus generally comprises a forwarding table identifying a primary path and a backup path in an Ethernet Virtual Connection and a processor operable to identify a failure in the primary path, switch to the backup path, and advertise the failure to at least one node in the primary path.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A system and method described herein provide redundancy for static point-to-multipoint and multipoint-to-multipoint Ethernet Virtual Connections (EVCs). As described in detail below, resiliency is provided through setting primary and backup paths with minimum or no overlap and using connectivity fault management to detect loss of connectivity. A synchronization mechanism is provided for transition from the primary path to the backup path.

Figure 1:
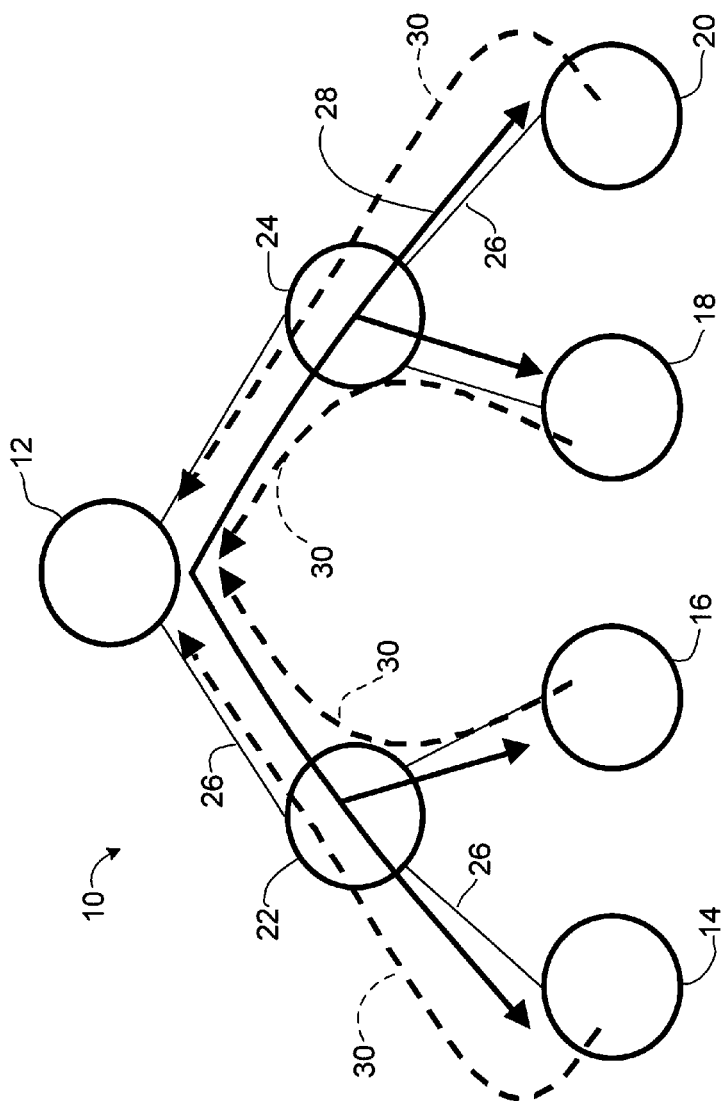
FIG. 1 illustrates an example of a point-to-multipoint Ethernet Virtual Connection (EVC) in which embodiments described herein may be implemented.

Referring now to the drawings, and first to FIG. 1, an example of a point-to-multipoint EVC 10 in which embodiments described herein may be implemented is shown. The embodiments described herein operate in the context of a data communication network including multiple network devices. Some of the devices in a network may be switches (e.g., access switch, aggregation switch), bridges, gateways, or other network devices. The network device may include, for example, a master central processing unit (CPU), memory, interfaces, and a bus. In one embodiment, the network device is implemented on a general purpose network host machine as described below with respect to FIG. 4.

The EVC shown in FIG. 1 includes one root node 12, a plurality of leaf nodes 14, 16, 18, 20, and intermediate nodes 22, 24 located between the root node and leaf nodes. The nodes are connected via links 26. The root node 12 may be, for example, a provider edge switch and the leaf nodes may be provider switches within a provider backbone bridged network. The root node may be in communication with a customer network or another provider bridged network (not shown). It is to be understood that the network shown in FIG. 1 is only an example and that the method and system described herein may be implemented in networks having different configurations and different types or number of nodes, without departing from the scope of the invention.

EVC 10 is asymmetric in the sense that the root node 12 has unidirectional connectivity to all leaf nodes 14, 16, 18, 20 in the downstream direction, whereas each leaf node has unidirectional connectivity only to the root node in the upstream direction. The leaf nodes thus only have connectivity to the root node and not to the other leaf nodes. The EVC 10 can be modeled as an overlay of a single tree 28 (downstream) and N point-to-point lines 30 (upstream), where N is the number of leaf nodes. In the example of FIG. 1, N=4. The downstream tree 28 is uniquely identifiable using a combination of a multicast (B-MAC (Backbone Media Access Control)) address and VLAN-ID (Virtual Local Area Network ID) (also referred to as a B-Tag (backbone VLAN tag)). The upstream line is uniquely identifiable using a combination of unicast (B-MAC) address and VLAN-ID. The B-MAC is an address associated with a provider device (e.g., port, engine, linecard) and used in creating the MAC header of frames transmitted across a provider backbone bridged network. Multicast and unicast B-MAC addresses are used to construct the point-tomultipoint EVC. By utilizing a combination of B-MAC and VLAN-ID, a specific path can be mapped to ensure consistency in traffic flow and enable differentiation between connections across a network.

Figure 2:
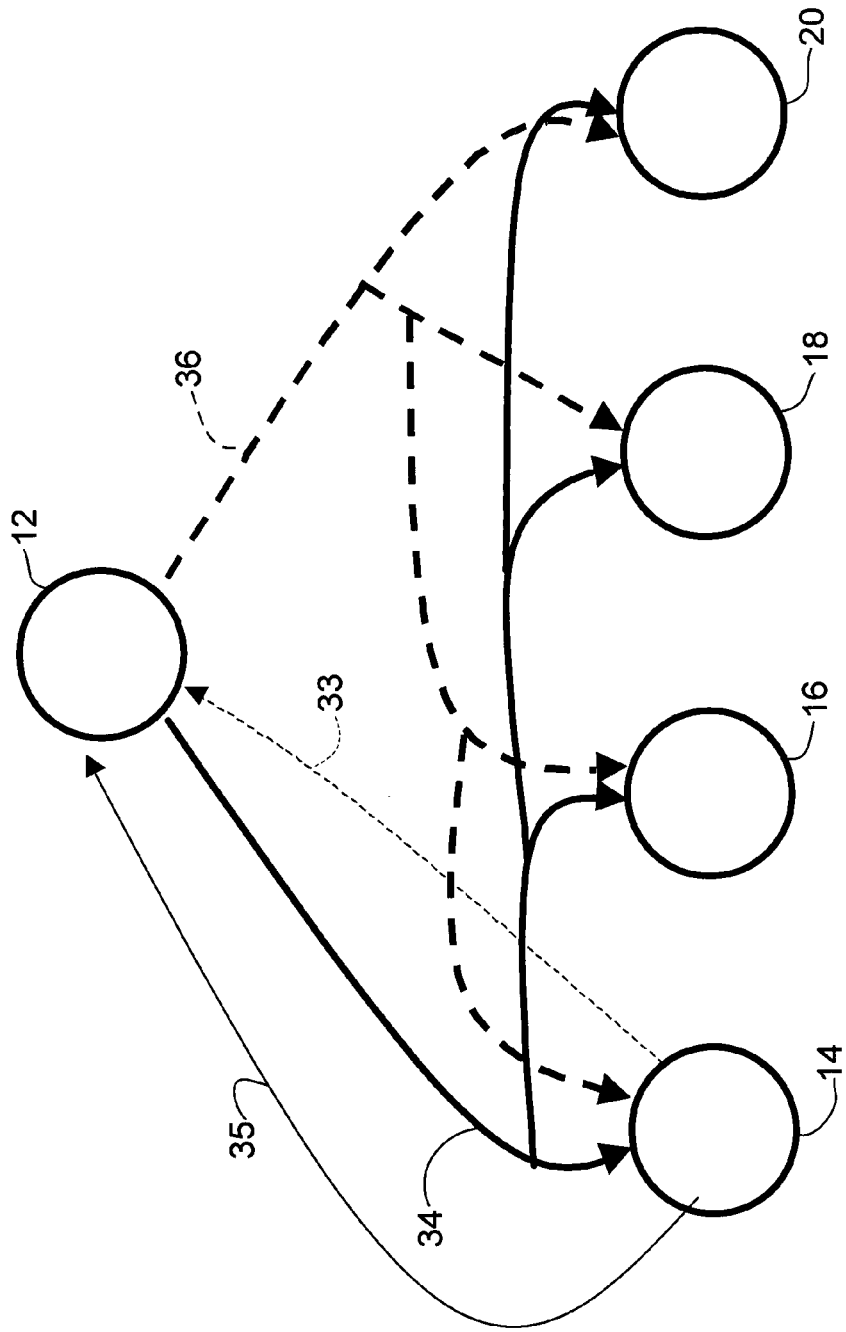
FIG. 2 illustrates a primary path and backup path in the Ethernet Virtual Connection of FIG. 1.

Resiliency is provided for the point-to-multipoint service between the root node 12 and set of N leaves (14, 16, 18, 20) with a primary (active) path 34 and backup (standby, secondary) path 36, as shown in FIG. 2. Each path 34, 36 extends from the root node 12 to each of the leaf nodes 14, 16, 18, 20. It is to be understood that the term "path" as used herein may include any number of links and nodes traversed by data forwarded from the root node 12 to one or more of the leaf nodes 14, 16, 18, 20. The primary and backup paths each include a return path from each of the leaf nodes to the root node. For simplification only one pair of return paths 33, 35 are shown in FIG. 2. Also, for simplification, intermediate nodes are not shown in FIG. 2. The primary and backup paths 34, 36, as well as paths 33 and 35, preferably have a minimum amount of overlap in terms of transient nodes and links in order to maximize resiliency. In an ideal case, there is no transient link/node overlap between the primary and backup paths (trees, or lines for reverse path (leaf to root)). A primary path and backup path are created for each given service.

In one embodiment, the system uses a data plane and frame format similar to that described in IEEE 802.1ah, with the MAC learning and Spanning Tree Protocol (STP) turned off. Data is forwarded using a B-MAC destination address and the VLAN-ID. The nodes 12, 14, 16, 18, 20, 22, 24 each include a bridge forwarding table (filtering database) for each VLAN-ID. The table may include, for example, a table identifier and a B-MAC address and VLAN-ID for each entry. Bridge MIBs (Management Information Bases) may be used to configure the forwarding tables. The table may be configured via a network management system, as described below.

The network management system is used to configure B-MACs and VLANs along the primary and backup paths. The topology and forwarding path may be selected by the NMS (Network Management System)/OSS (Operations Support System), for example. Determination of the topology and forwarding path may also be made by a combination of NMS static provisioning of root and leaf endpoints with a dynamic multicast address pruning mechanism such as GMRP (GARP (Generic Attribute Registration Protocol) Multicast Registration Protocol) or MRP (Multicast Registration Protocol). In this case GMRP or MRP is preferably implemented on all nodes (root, leaf, and intermediate nodes).

The EVC shown in FIG. 2 may also be configured as a multipoint-to-multipoint EVC by connecting two point-to-multipoint paths. A multipoint-to-multipoint EVC may be configured by means of overlaying a set of point-to-multipoint paths from each given node to one or more other nodes that participate in the service. For example, the nodes of FIG. 2 may each include a path to every other node to create a multipoint-to-multipoint EVC. In this case, every node in the service is effectively the root of its own point-to-multipoint tree. This creates a multipoint-to-multipoint service between the nodes, where every node has connectivity to every other node. Each node may use a multicast B-MAC+B-VLAN to define its point-to-multipoint path.

As described below, continuity checks are employed to monitor the connectivity of the primary path 34 and backup path 36. When the primary path 34 fails, a failover is induced to the backup path 36, as long as the backup path does not have any loss of connectivity.

A continuity check is run between the root node 12 and leaf nodes 14, 16, 18, 20. In one embodiment, the continuity check is performed using Connectivity Fault Management (CFM) similar to described in Draft Standard IEEE 802.1ag, entitled Connectivity Fault Management. Continuity Check (CC) messages are periodically sent to remote nodes within the EVC to detect discontinuity. If a remote node does not receive the CC message in a timely fashion, the remote node discerns a loss of continuity (LOC) defect. In one embodiment, the CFM messages are standard Ethernet frames distinguished by their destination MAC addresses or EtherTypes from ordinary customer frames. CFM only needs to be implemented at the root node 12 and leaf nodes 14, 16, 18, 20, and is not required at the intermediate nodes 22, 24. The intermediate nodes respond to CFM messages sent by a root node or leaf node, or forwarded by another intermediate node, by forwarding the CFM messages.

The root node 12 sends regular multicast CC messages to all of the leaf nodes 14, 16, 18, 20 and the leaf nodes send unicast CC messages to the root node. In one embodiment, the CC messages are transmitted often enough that two consecutive CC messages can be lost without causing the information to time out in any of the receiving nodes. The nodes receiving the CC messages track their senders. For example, a node may be configured with a list of all of the other nodes sending CC messages thereto, so that it can compare this list against the list of CC messages received. Upon receiving CC messages at the receiving node, a CC validity timer is started which is used to determine the loss of CC messages. A LOC is detected when the next CC message is not received within the timeout of the validity timer. If n consecutive CC messages from the remote node are lost, a fault for that remote node is detected. When a node stops receiving CC messages from a remote node, it assumes that either the remote node has failed or an unrecoverable failure on the path has occurred. When any of the service endpoints (root node or leaf node) detects a LOC condition, the endpoint switches over to the backup path by marking the backup path as active in its forwarding table and performing a synchronization process with the rest of the nodes, as described below. If the backup path experiences a LOC condition, then no failover occurs and an operator is alerted via alarms or other reporting mechanism.

An LOC condition is defined as follows, first for the root node 12 and then for the leaf nodes 14, 16, 18, 20.

The root node enters an LOC state when at least one of the following conditions occurs:
  Root stops receiving CC messages from at least one leaf node for a period of time equal to or exceeding the CC lifetime of the leaf node.
  Root receives a CC message from at least one of the leaf nodes with a failure indication (e.g., RDI bit set).
  Root detects a local fault condition (e.g., loss of signal, lower layer defect) on the interface/link leading to the active tree.

A leaf enters an LOC state when at least one of the following conditions occur:
  Leaf node stops receiving CC messages from the root node for a period of time equal to or exceeding the CC lifetime of the root node.
  Leaf receives a CC message from the root node with a failure indication (e.g., RDI bit set).
  Leaf detects a local fault condition (e.g., loss of signal, lower layer defect) on the interface/link leading to the active tree.

The following describes synchronization between the nodes upon switching from the primary path 34 to the backup path 36, or switching from primary path 35 to backup path 33. The synchronization is thus performed upon failover of either the downstream path (root node 12 to leaf nodes 14, 16, 18, 20) or at least one of the upstream paths (leaf node to root node). In one embodiment, an extension TLV to the CFM CC messages is used. The TLV carries the identifier of the active path that a current node is using. At steady state, all nodes advertise the same identifier. When a failover occurs, the node that detects the LOC condition switches over to the backup path and starts advertising the identifier of the backup path (new active path). Two scenarios may arise:

First, the node that detected LOC is the root node. In this case, all the leaf nodes get synchronized to the backup path on the next CC advertisement, since it is multicast to all leaves.

Second, the node that detected LOC is a leaf node. In this case, the root node will be the first node to get synchronized when it receives a CC message from the leaf node. The root node switches over to the backup path and starts advertising the ID of the backup path (new active path) in its own CC messages. This leads to the synchronization of all remaining leaf nodes per the first scenario above.

In another embodiment, no synchronization is required. In this case, both the primary and secondary paths 34, 36, and each of the paths from a leaf node to the root node, are active at the same time (i.e., the root node transmits traffic on both paths and each leaf node transmits traffic on both paths to the root node). The node receiving transmission on two paths ignores one of the transmissions to avoid frame duplication. In this embodiment, there is no interruption to data traffic on failover, however, there is an increased cost of utilization.

The above describes continuity checks and synchronization for the point-to-multipoint example. In a multipoint-to-multipoint EVC, each node may also run CFM using a dedicated multicast address. The means of detecting LOC follows the root node behavior described above for point-to-multipoint service. Synchronization procedures for any node follow the same procedures as the root node in the point-to-multipoint service.

Figure 3:
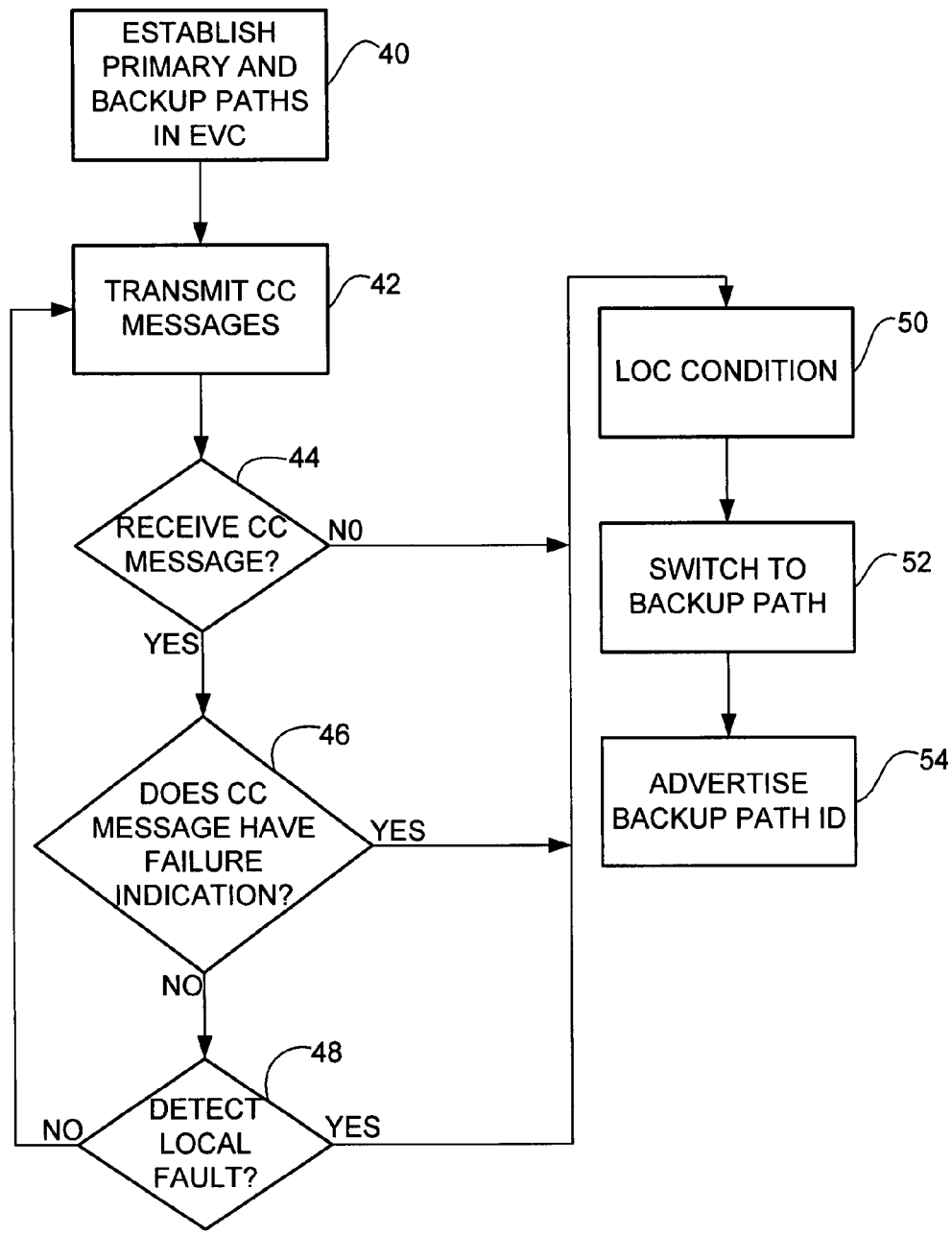
FIG. 3 is a flowchart illustrating a process for providing resiliency in point-to-multipoint or multipoint-to-multipoint Ethernet Virtual Connections.

FIG. 3 is a flowchart illustrating a process for implementing resiliency for point-to-multipoint Ethernet Virtual Connections. At step 40, primary path 34 and backup path 36 from the root node 12 to the leaf nodes 14, 16, 18, 20, and primary paths 33 and backup paths 35 for each leaf node are established (FIGS. 2 and 3). Continuity check messages are transmitted at periodic intervals (step 42). If a node stops receiving CC messages, the node goes into LOC state (steps 44 and 50). As previously discussed, there may have to be a number of missed CC messages before a failure is identified. If a node receives a CC message from another node with a failure indication, the node goes into LOC state (steps 46 and 50). If the node detects a local fault, the node goes into LOC state (steps 48 and 50).

The node that detects the LOC condition, switches to the backup path (step 52) and advertises the switching to the backup path by transmitting the identifier of the backup path (new active path) (step 54) to perform a synchronization process. If the node that detected the LOC condition is the root node, all leaf nodes will get synchronized to the backup path on the next CC advertisement. If the node that detected LOC is a leaf node, the root node will first get synchronized and advertise the new ID in its own CC messages so that the remaining leaf nodes are synchronized.

It is to be understood that the process described above is only one example and that steps may be added or removed without departing from the scope of the invention. For example, the synchronization step 54 may be removed if both the primary and backup paths are active at the same time, as previously discussed.

Figure 4:
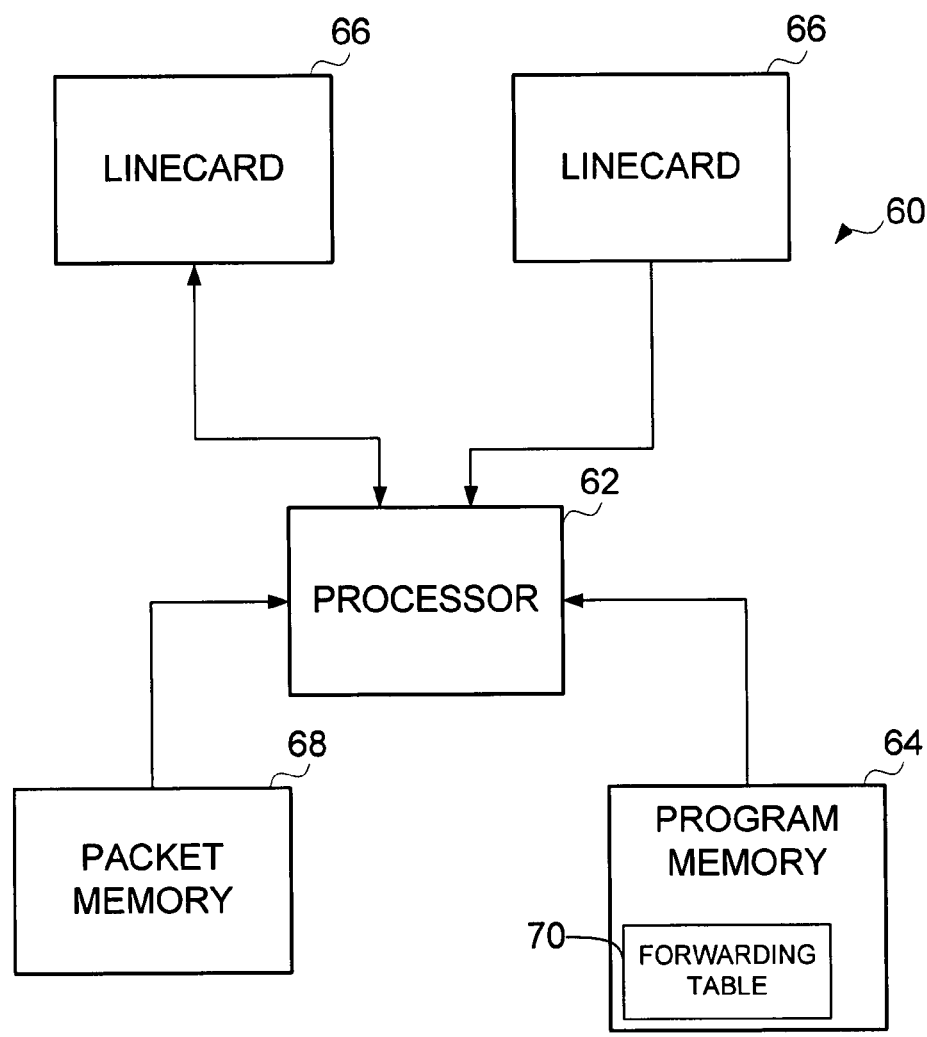
FIG. 4 depicts an example of a network device useful in implementing embodiments described herein.

FIG. 4 depicts a network device 60 that may be used to implement embodiments described herein. Network device 60 is configured to implement all of the network protocols and extensions thereof described above. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes is a type of non-volatile storage such as floppy disks, CD-ROMs, DVD-ROMs, hard disks, flash memory, etc. Memory 64 may be used, for example, to store forwarding table 70.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole. It is to be understood that the network device 60 shown in FIG. 4 and described above is only one example and that different configurations of network devices may be used.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   transmitting continuity check messages from a node in an Ethernet Virtual Connection connecting at least one root node and a plurality of leaf nodes in a point-to-multipoint or multipoint-to-multipoint connection, said point-to-multipoint connection between the root node and said plurality of leaf nodes comprising a primary path and a backup path;
   identifying a failure in said primary path between the root node and said plurality of leaf nodes;
   switching to said backup path; and
   advertising said switching to said backup path to at least one of the nodes;
   wherein said node transmitting continuity check messages is the root node and advertising comprises transmitting a multicast continuity check message to said plurality of leaf nodes.

2. The method of claim 1 wherein identifying a failure comprises identifying one or more missing continuity check messages from one of the nodes.

3. The method of claim 1 wherein identifying a failure comprises receiving a continuity check message indicating a failure from one of the nodes.

4. The method of claim 1 wherein advertising said switching comprises advertising an identifier of said backup path.

5. The method of claim 1 wherein identifying a failure comprises detecting a local failure at one of the nodes.

6. The method of claim 1 wherein switching to said backup path comprises changing a forwarding table to identify said backup path as an active path.

7. An apparatus comprising:
   a forwarding table identifying a primary path and a backup path in an Ethernet Virtual Connection connecting at least one root node and a plurality of leaf nodes in a point-to-multipoint or multipoint-to-multipoint connection; and a processor operable to identify a failure in said primary path, switch to said backup path, and advertise said switch to said backup path to at least one of the nodes;

wherein the processor is located at the root node and said advertisement comprises a multicast continuity check message transmitted to said plurality of leaf nodes and comprising an identifier of said backup path.

8. The apparatus of claim 7 wherein said primary and backup paths are set up utilizing GMRP (GARP (Generic Attribute Registration Protocol) Multicast Registration Protocol) or MRP (Multicast Registration Protocol).

9. The apparatus of claim 7 wherein the processor is further operable to transmit continuity check messages.

10. An apparatus comprising:
a forwarding table identifying a primary path and a backup path in an Ethernet Virtual Connection connecting at least one root node and a plurality of leaf nodes in a point-to-multipoint or multipoint-to-multipoint connection; and a processor operable to identify a failure in said primary path, switch to said backup path, and advertise said switch to said backup path to at least one of the nodes;

wherein the processor is located at one of said plurality of leaf nodes and said advertisement comprises a unicast continuity check message transmitted to the root node and comprising an identifier of said backup path.

11. The apparatus of claim 7 wherein the processor is configured to measure time between receipt of continuity check messages from each of the nodes in the primary path and identify a failure if a continuity check message is not received for a predetermined period of time.

12. The apparatus of claim 7 wherein the processor is configured to identify said backup path as an active path in the forwarding table upon switching to said backup path.

13. The apparatus of claim 7 wherein said processor is operable to transmit continuity check messages to the other nodes, said messages comprising an identifier of said backup path as an active path.

14. An apparatus comprising:
means for transmitting continuity check messages from a node in an Ethernet Virtual Connection connecting a root node and a plurality of leaf nodes in a multipoint-to-multipoint connection, said connection between the root node and said plurality of leaf nodes comprising a primary path and a backup path;

means for identifying a failure in said primary path between the root node and said plurality of leaf nodes;

means for switching to said backup path; and means for advertising said switching to said backup path to at least one of the nodes; wherein means for advertising said switching comprises means for advertising an identifier of said backup path.

15. The apparatus of claim 14 wherein said node transmitting continuity check messages is the root node and means for advertising comprises means for transmitting a multicast continuity check message to said plurality of leaf nodes.

16. The apparatus of claim 14 wherein means for identifying a failure comprises means for receiving a continuity check message indicating a failure from one of the nodes.

17. The apparatus of claim 16 wherein said received continuity check message comprises an identifier of said backup path.

18. The apparatus of claim 14 wherein means for switching to said backup path comprises means for changing a forwarding table at the node transmitting said continuity check messages, to identify said backup path as an active path.

19. The apparatus of claim 14 wherein means for identifying a failure comprises means for identifying one or more missing continuity check messages from one of the nodes.

* * * * *